(12) United States Patent
Chaiko

(10) Patent No.: US 7,420,071 B2
(45) Date of Patent: Sep. 2, 2008

(54) THERMALLY STABLE SURFACTANTS AND COMPOSITIONS AND METHODS OF USE THEREOF

(75) Inventor: David J. Chaiko, Woodridge, IL (US)

(73) Assignee: UChicago Argonne, LLC, Chicago, IL (US)

( * ) Notice: Subject to any disclaimer, the term of this patent is extended or adjusted under 35 U.S.C. 154(b) by 622 days.

(21) Appl. No.: 11/121,425

(22) Filed: May 4, 2005

(65) Prior Publication Data

US 2006/0252851 A1 Nov. 9, 2006

(51) Int. Cl.
*C11D 1/28* (2006.01)
*C07C 51/00* (2006.01)
*C07C 67/00* (2006.01)
*C07C 229/00* (2006.01)
*C11B 11/00* (2006.01)

(52) U.S. Cl. .............................. 554/78; 554/80; 554/81; 554/82; 554/85; 554/94; 554/103; 554/108; 554/124; 554/129; 554/130; 524/115; 524/186

(58) Field of Classification Search ................... 554/78, 554/80, 81, 82, 85, 94, 103, 108, 124, 129, 554/130; 524/115, 186
See application file for complete search history.

(56) References Cited

U.S. PATENT DOCUMENTS

| | | | |
|---|---|---|---|
| 3,977,894 A | 8/1976 | White et al. | |
| 4,412,018 A | 10/1983 | Finlayson et al. | |
| 4,434,075 A | 2/1984 | Mardis et al. | |
| 4,435,217 A | 3/1984 | House | |
| 4,517,112 A | 5/1985 | Mardis et al. | |
| 4,810,734 A | 3/1989 | Kawasumi et al. | |
| 4,816,517 A | 3/1989 | Wilkus et al. | |
| 5,286,475 A * | 2/1994 | Louvet et al. ................. | 424/45 |
| 5,430,566 A | 7/1995 | Sakaya et al. | |
| 5,552,469 A | 9/1996 | Beall et al. | |
| 5,554,670 A | 9/1996 | Giannelis et al. | |
| 5,582,638 A | 12/1996 | Coutelle et al. | |
| 5,645,758 A | 7/1997 | Kawasumi et al. | |
| 5,698,624 A | 12/1997 | Beall et al. | |
| 5,726,247 A | 3/1998 | Michalczyk et al. | |
| 5,747,560 A | 5/1998 | Christiani et al. | |
| 5,753,240 A * | 5/1998 | Bollens et al. .............. | 424/401 |
| 5,837,763 A | 11/1998 | Ferraro et al. | |
| 5,840,796 A | 11/1998 | Badesha et al. | |
| 5,876,812 A | 3/1999 | Frisk et al. | |
| 5,910,523 A | 6/1999 | Hudson | |
| 5,962,553 A | 10/1999 | Ellsworth | |
| 6,034,163 A | 3/2000 | Barbee et al. | |
| 6,036,765 A | 3/2000 | Farrow et al. | |
| 6,043,300 A | 3/2000 | Santhanam | |
| 6,060,549 A | 5/2000 | Li et al. | |
| 6,084,019 A | 7/2000 | Matayabas, Jr. et al. | |
| 6,103,817 A | 8/2000 | Usuki et al. | |
| 6,136,908 A | 10/2000 | Liao et al. | |
| 6,156,835 A | 12/2000 | Anderson et al. | |
| 6,172,121 B1 | 1/2001 | Chaiko | |
| 6,225,374 B1 | 5/2001 | Vaia et al. | |
| 6,255,344 B1 * | 7/2001 | Philippe et al. ............. | 514/556 |
| 6,262,162 B1 | 7/2001 | Lan et al. | |
| 6,271,297 B1 | 8/2001 | Ishida | |
| 6,271,298 B1 | 8/2001 | Powell | |
| 6,380,295 B1 | 4/2002 | Ross et al. | |
| 6,407,155 B1 | 6/2002 | Qian et al. | |
| 6,521,678 B1 | 2/2003 | Chaiko | |
| 6,632,868 B2 | 10/2003 | Qian et al. | |
| 6,670,086 B2 | 12/2003 | Nadolsky et al. | |
| 6,759,463 B2 | 7/2004 | Lorah et al. | |
| 6,790,896 B2 | 9/2004 | Chaiko | |
| 6,822,035 B2 | 11/2004 | Chaiko | |
| 6,841,226 B2 | 1/2005 | Dontula et al. | |
| 6,864,308 B2 | 3/2005 | Rosenthal et al. | |
| 7,244,764 B2 * | 7/2007 | Kong et al. ................. | 514/554 |
| 2006/0135403 A1 * | 6/2006 | Gervais et al. ................. | 514/2 |

OTHER PUBLICATIONS

Jordan, John W., "Organophilic Bentonites," *J. Phys. Colloid Chem.*, vol. 53, pp. 294-306, 1949, published by Baltimore, Williams & Wilkins Co.

Kawasumi, M., et al., "Liquid Crystalline Composite Based on a Clay Mineral," *Mol. Cryst. Liq. Cryst.*, vol. 281, pp. 91-103, 1996, published by Gordon and Breach Science Publishers SA, printed in Malaysia.

Kawasumi, M., et al., "Preparation and Mechanical Properties of Polypropylene—Clay Hybrids," *Macromolecules*, vol. 30, pp. 6333-6338, 1997, published by American Chemical Society.

Hasegawa, N., et al., "Preparation and Mechanical Properties of Polypropylene-Clay Hybrids Using a Maleic Anhydride-Modified Polypropylene Oligomer," *J. Appl. Poly. Sci.*, vol. 67, pp. 87-92, 1998, published by John Wiley & Sons, Inc.

\* cited by examiner

*Primary Examiner*—Nathan M Nutter
(74) *Attorney, Agent, or Firm*—Foley & Lardner LLP

(57) ABSTRACT

There are provided novel thermally stable surfactants for use with fillers in the preparation of polymer composites and nanocomposites. Typically, surfactants of the invention are urethanes, ureas or esters of thiocarbamic acid having a hydrocarbyl group of from 10 to 50 carbons and optionally including an ionizable or charged group (e.g., carboxyl group or quaternary amine). Thus, there are provided surfactants having Formula I:

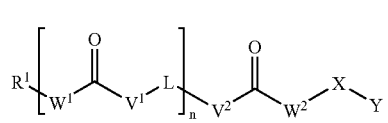

wherein the variables are as defined herein. Further provided are methods of making thermally stable surfactants and compositions, including composites and nanocomposites, using fillers coated with the surfactants.

15 Claims, 3 Drawing Sheets

THERMALLY STABLE SURFACTANTS AND COMPOSITIONS AND METHODS OF USE THEREOF

STATEMENT REGARDING FEDERALLY SPONSORED RESEARCH

The United States Government has rights in this invention pursuant to Contract No. W-31-109-ENG-38 between the United States Department of Energy and the University of Chicago representing Argonne National Laboratory.

FIELD OF THE INVENTION

This invention relates polymer composites and nanocomposites. In particular the invention relates to compositions and methods utilizing surfactants on the surface of clay and non-clay fillers in polymer composites and nanocomposites. More particularly, the invention relates to methods for the surface modification of hydrophilic fillers to provide compatibility between the filler and hydrophobic polymers such as polyolefins.

BACKGROUND OF THE INVENTION

Significant research has focused on developing methods to incorporate clays and other hydrophilic fillers into hydrophobic polymers to increase mechanical and barrier properties of composites and nanocomposites. One approach has been to treat the hydrophilic filler surface to render it compatible with hydrophobic materials such as polyolefins and waxes. Organoclay fillers are commonly subjected to this treatment. Generally, this surface treatment consists of an adsorbed monolayer of a high-molecular-weight quaternary amine, such as dimethyl dihydrogenated tallow amine. The surfactant adsorption takes place via an ion-exchange reaction involving the negatively charged basal surface of the clay platelets.

The simple mechanism in which organoclays and other fillers can improve barrier properties in the hydrophobic polymer relies on the high aspect ratio of the filler to impart a tortuous path that retards the transport of diffusing species like oxygen or water vapor. In a strictly tortuous path mechanism, all diffusing species would be retarded to the same degree. However, theoretical barrier properties are commonly missing in actual experimentation and composite and nanocomposite performance has not always lived up to expectations. It is typical to have barrier improvements of only two- to four-fold.

To overcome the difficulties in dispersing fillers in hydrophobic polymers like the polyolefins, researchers have used functionalized polymers, like maleated polyethylene and polypropylene, as dispersants. Although polar functional groups can interact with the filler surface and compatiblizing agents can promote dispersion, this approach to nanocomposite formation has provided only modest improvements in the mechanical properties of polyolefins. Accordingly, there is a need for a rational approach to the design of new surfactant surface chemistries that enable the preparation of composites and nanocomposites which demonstrate significant improvements in physical properties such as increased mechanical and barrier performance.

SUMMARY OF THE INVENTION

In accordance with one aspect, the present invention provides surfactants that bind to fillers used in polymer composites and nanocomposites. These surfactants are thermally stable and increase dispersion of the fillers and improve barrier properties of the polymer composites and nanocomposites. The fillers to which the surfactants bind include organoclays, glass or carbon fibers, and other particulates commonly used in the preparation of composites and nanocomposites. Also provided are methods for making these surfactants. More specifically, the invention permits the preparation of surfactants that match the melt/freeze transition of many polymers used in the art. As a non-limiting example, these thermally stable surfactants can be matched to the melt/freeze transition of polymers such as low density polyethylene (LDPE), high density polyethylene (HDPE), polypropylene (PP), Nylon, ethylene vinyl alcohol copolymer (EVOH), ethylene vinyl acetate copolymer (EVA), and polystyrene.

The present invention also provides for the preparation of composites and nanocomposites wherein the surfactant-coated hydrophilic filler is homogeneously dispersed throughout the polymer matrix. Such composites and nanocomposites exhibit superior dispersion stability such that the hydrophilic filler is dispersed in the polymer melt and is capable of maintaining the homogenous dispersion as the polymer cools to a semi-crystalline solid. Such composites and nanocomposites also display superior mechanical and barrier properties. Inventive methods also provide for fillers that act as nucleating agents by virtue of their high specific surface areas and appropriately designed recrystallization temperatures.

DETAILED DESCRIPTION OF THE INVENTION

Figure 1:
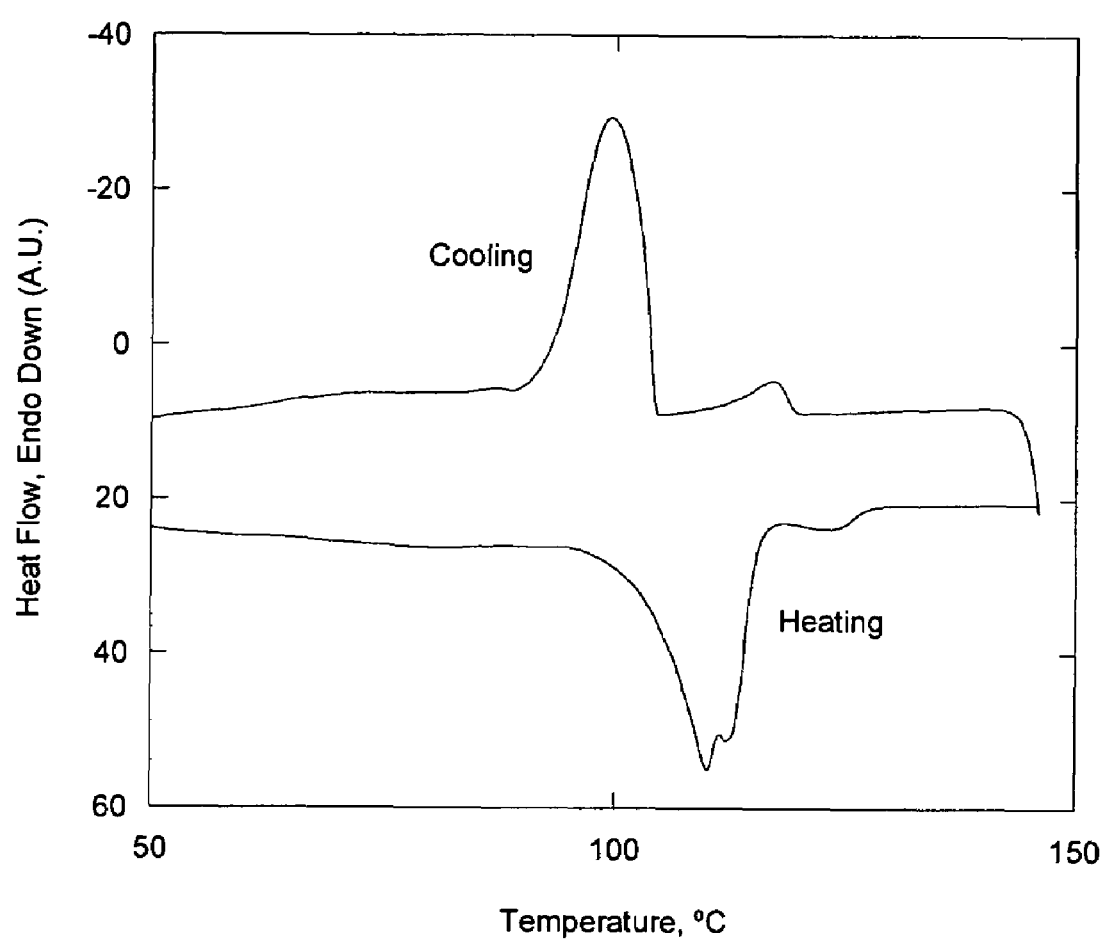
FIG. 1. DSC trace of the surfactant product of Example 1 showing melt/freeze transitions that are comparable to LDPE.

The present invention relates to thermally stable surfactants for the preparation of polymer composites and nanocomposites having superior mechanical and/or barrier properties. The surfactants are used to coat one or more surfaces of the fillers that are admixed with hydrophobic polymers to produce the composites and nanocomposites. Surfactants of the invention have freeze/melt temperatures that are sufficiently matched to the freeze/melt temperatures of hydrophobic polymers so as to allow homogenous dispersions of the fillers in the hydrophobic polymers.

Surfactants of the invention are urethanes, ureas, carbonate diesters, diesters of thiocarbonic acid, or esters of thiocarbamic acid that include a hydrocarbyl group optionally substituted with one or more halogens (i.e., F, Cl, Br, I). As employed herein, a hydrocarbyl group is a group consisting of carbon and hydrogen only, including but not limited to straight or branched alkyl, alkenyl, or alkynyl groups, cycloalkyl groups, and aryl and aralkyl groups. Typically, the hydrocarbyl group has from 10 to 100 carbon atoms. In some embodiments, the surfactants include one or two hydrocarbyl groups. The surfactants optionally include an ionizable or charged group (e.g., carboxyl group or quaternary amine). In other embodiments, the surfactant may have a polymeric hydrocarbyl group of more than 100 carbons such as polyethylene or polypropylene.

Thermally stable surfactants particularly suited for use in the invention include compounds having Formula I:

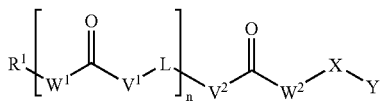

wherein $W^1$ and $W^2$ are independently O, S, or NH;

$V^1$ and $V^2$ are independently O or NH;

L and X are independently a $C_{2-20}$ alkylene, cycloalkylene, or arylene group, optionally substituted with one or more F, Cl, Br, or $CF_3$.

Y is $-COOR^2$, $-N(R^3)_3{}^+Z$, $-OSO_3R^4{}_2$, $-SO_3R^4$, $-OPO_3R^4{}_2$, $-PO_3R^4$, or $-PO_2R^4$; or X and Y together form $R^1$;

Z is a negatively charged counter ion;

$R^1$ at each occurrence is independently a $C_{10\text{-}100}$ alkyl, alkenyl, or polyethylene glycol group, each optionally substituted with one or more F, Cl, or Br;

$R^2$ is H, a positively charged counter ion, or an alkyl, alkenyl, aryl, aralkyl, heterocyclyl, or heterocyclalkyl group;

$R^3$ at each occurrence is independently $C_{1-4}$ alkyl;

$R^4$ at each occurrence is independently H or a positively charged counter ion; and n is 0, 1, 2, or 3.

In some embodiments of compounds of Formula I, $W^1$ is O or NH, and/or $W^2$ is O or NH, and/or, $W^1$ and $W^2$ are both O or both NH. In still other embodiments, $V^1$ is O or NH, and in others, $V^1$ and $V^2$ are both O or both NH. Alternatively, one of $W^1$ and $V^1$ is O and one is NH, and one of $W^2$ and $V^2$ is O and one is NH. In yet other embodiments, L and X are each a $C_{2-20}$ alkylene optionally substituted with one or more F, Cl, or Br. For example, L and X may each be independently ethylene, propylene, butylene, hexylene, octylene, decylene, dodecylene, phenylene or tolylene. In some embodiments, Y is $-COOH$ or $-N(CH_3)_3{}^+Z$. Z can be, for example $F^-$, $Cl^-$, $Br^-$, $I^-$, $SO_4{}^{2-}$, $HSO_4{}^-$, or $CH_3OSO_3{}^-$. In other embodiments, $R^1$ at each occurrence is independently a $C_{10\text{-}100}$ alkyl or alkenyl group, each optionally substituted with one or more F, Cl, or Br. Alternatively, $R^1$ can be a $C_{20\text{-}60}$ polyethylene group optionally substituted with one or more F, Cl, or Br. In still others, $R^2$ is H, $Li^+$, $Na^+$, $K^+$, methyl, ethyl, or benzyl.

Unless otherwise defined, alkyl groups include straight chain and branched alkyl groups having from 1 to about 20 carbon atoms, and typically from 1 to 100 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, and isopentyl groups. Examples of alkyl groups having ten or more carbons include but are not limited to decyl, undecyl, dodecyl, tridecyl, tetradecyl, hexadecyl, octadecyl, and icosyl groups.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above.

Cycloalkylalkyl groups are alkyl groups as defined above in which a hydrogen or carbon bond of an alkyl group is replaced with a bond to a cycloalkyl group as defined above.

Aryl groups are cyclic aromatic hydrocarbons that do not contain heteroatoms. Thus aryl groups include, but are not limited to, phenyl, azulenyl, heptalenyl, biphenylenyl, indacenyl, fluorenyl, phenanthrenyl, triphenylenyl, pyreny;, naphthacenyl, chrysenyl, biphenyl, anthracenyl, and naphthenyl groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups.

Aralkyl groups are alkyl groups as defined above in which a hydrogen or carbon bond of an alkyl group is replaced with a bond to an aryl group as defined above. Representative aralkyl groups include benzyl groups and fused (cycloalkylaryl)alkyl groups such as 4-ethyl-indanyl.

Heterocyclyl groups include aromatic and non-aromatic ring compounds containing 3 or more ring members, of which, one or more is a heteroatom such as, but not limited to, N, O, and S. In some embodiments, heterocyclyl groups include 3 to 20 ring members, whereas other such groups have 3 to 15 ring members. The phrase "heterocyclyl group" includes fused ring species including those comprising fused aromatic and non-aromatic groups. The phrase also includes polycyclic ring systems containing a heteroatom such as, but not limited to, quinuclidyl. However, the phrase does not include heterocyclyl groups that have other groups, such as alkyl or halo groups, bonded to one of the ring members. Rather, these are referred to as "substituted heterocyclyl groups." Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups.

Heterocyclylalkyl groups are alkyl groups as defined above in which a hydrogen or carbon bond of an alkyl group is replaced with a bond to a heterocyclyl group as defined above. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

Alkylene groups are saturated, divalent straight or branched chain alkyl groups. Cycloalkylene and arylene groups are, respectively, divalent cycloalkyl and aryl groups.

As indicated above, n can be 0, 1, 2, or 3. When n is 0, compounds of Formula I have the Formula IA:

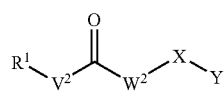

wherein the variables $R^1$, $V^2$, $W^2$, X and Y are as defined for Formula I. In some embodiments, $V^2$ is O and $W^2$ is NH, and in others, $V^2$ is NH and $W^2$ is O.

Compounds of Formula I wherein n is 1 have the Formula IB:

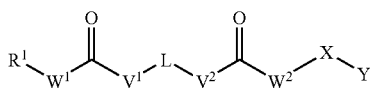

IB wherein each of the variables $R^1$, $W^1$, $W^2$, $V^1$, $V^2$, L, X and Y is defined as in Formula I. In some embodiments, both $W^1$ and $W^2$ are O and both $V^1$ and $V^2$ are NH. In others, both $W^1$ and $W^2$ are NH and both $V^1$ and $V^2$ are O. In still others, one of $V^1$ and $V^2$ is O and the other is NH.

Similarly, when n is 2 or 3, compounds of Formula I have the structure of Formula IC and ID, respectively. As indicated above, L, $V^1$ and $W^1$ at each occurrence may be the same or different.

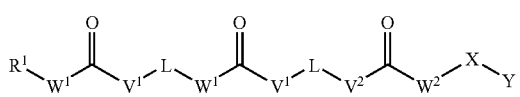

IC

ID

Compounds of Formula I may be prepared by any of several methods. One method includes reacting an isocyanate having the structure $R^1$-L-NC with H—$W^2$—X—Y to provide a compound of Formula IA1

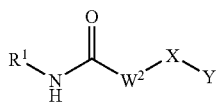

IA1 wherein
$W^2$ is O, S, or NH;
X is a $C_{2-20}$ alkylene, cycloalkylene, or arylene group, optionally substituted with one or more F, Cl, Br, or $CF_3$;
Y is —$COOR^2$ or —$N(R^3)_3^+Z$; or X and Y together form $R^1$;
Z is a negatively charged counter ion;
$R^1$ at each occurrence is independently a $C_{10-100}$ alkyl, alkenyl, or polyethylene glycol group, each optionally substituted with one or more F, Cl, or Br;
$R^2$ is H, a positively charged counter ion, or an alkyl, alkenyl, aryl, aralkyl, heterocyclyl, or heterocyclalkyl group; and
$R^3$ at each occurrence is independently $C_{1-4}$ alkyl.

Similarly, an isocyanate having the structure OCN—$W^2$—X—Y can be reacted with $R^1$-L-$V^2$—H to provide a compound of Formula IA2

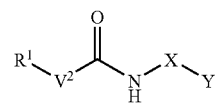

IA2 wherein the variables are as defined for Formula I.

Alternatively, a compound of Formula I may be prepared by reacting a diisocyanate having the structure OCN-L-NCO sequentially or simultaneously with compounds having the structure H—$W^2$—$R^1$ and H—$W^2$—X—Y to provide a compound of Formula IB1:

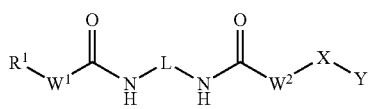

IB1 wherein
$W^1$ and $W^2$ are independently O, S, or NH;
L and X are independently a $C_{2-20}$ alkylene, cycloalkylene, or arylene group, optionally substituted with one or more F, Cl, Br, or $CF_3$;
Y is —COOR or —$N(R^3)_3^+Z$; or X and Y together form $R^1$;
Z is a negatively charged counter ion;
$R^1$ at each occurrence is independently a $C_{10-100}$ alkyl, alkenyl, or polyethylene glycol group, each optionally substituted with one or more F, Cl, or Br;
$R^2$ is H, a positively charged counter ion, or an alkyl, alkenyl, aryl, aralkyl, heterocyclyl, or heterocyclalkyl group; and
$R^3$ at each occurrence is independently $C_{1-4}$ alkyl.

In some embodiments of compounds of Formula IB1, Y is —$N(R^3)_3^+Z$ and H—$W^2$—X—Y is an ionic liquid. For example, H—$W^2$—X—Y can be the product of the reaction of choline chloride with zinc chloride.

Similarly, a compound of Formula I may be prepared by reacting a compound having the structure H—V¹-L-V²—H sequentially or simultaneously with compounds having the structure CN—W²—R¹ and CN—W²—X—Y to provide a compound of Formula IB2:

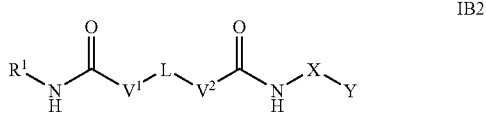

wherein the variables are as defined in Formula I.

It will be understood that compounds of Formula I that are diesters of thiocarbonic acid and carbonate can be readily prepared by methods known to those of skill in the art such as by the reaction of various chloroformates with suitable alcohols or thiols. Carbonates and ureas of Formula I may also be prepared by reaction of phosgene or similarly activated carbonyl compounds (e.g., carbonyl diimidazole) with various alcohols or amines. Ureas of Formula I may also be synthesized from low molecular weight carbonates such as dimethyl carbonate by reaction with appropriate amines. (See, e.g., Encyclopedia of Chemical technology, Vol. 5, 4$^{th}$ Ed., John Wiley & Sons, NY 1993, pp. 77-97.) Moreover, it will be understood that compounds where n is 2 or 3 may prepared by slight modification of the methods herein presented and that such modifications are well within the skill of the ordinary artisan.

In accordance with another aspect of the present invention, there are provided compositions comprising a filler in which the filler includes a surfactant as described herein (including, but not limited to, compounds of Formula I) on a surface thereof. Such compositions can include a polymer in which the melt/freeze transition of the surfactant and the melt/freeze transition of the polymer are sufficiently matched such that the filler is homogenously dispersed in the polymer. Thus, the compositions can be a composite or a nanocomposite.

The phrase "sufficiently matched" does not require that the recrystallization temperatures be identical either between surfactants or between the surfactant and the hydrophobic polymer. In polymeric systems or others in which the system, upon cooling, super cools before the crystallization transition occurs, the recrystallization (freeze) temperatures are more important than the melt temperatures. In the absence of super cooling, it is understood that the melt and freeze transition temperatures are identical. Indeed, a wide range of sufficiently matched melt/freeze temperatures is possible. In some embodiments, the melt/freeze temperature is within ±100% of the polymer freeze temperature. In other embodiments, the melt/freeze temperatures of the surfactant and the polymer are within ±50%. In still other embodiments, the melt/freeze temperatures of the surfactant is within ±25% of the polymer melt/freeze temperature, or even within ±10%. Typically, the barrier properties of a nanocomposite that includes a polymer and a filler with a bound surfactant will improve as the melt/freeze temperatures of the surfactant and the polymer become more closely matched.

A wide variety of polymers may be suitably employed in compositions and methods of the invention. Typically inventive compositions employ a hydrophobic polymer, i.e., a polymer that lacks ionizable functional groups such as carboxyl or amine groups, though the invention is not so limited. Suitable polymers include polyolefins, nylons, polyesters, and polycarbonates. For example, the polymer may be a low density polyethylene, a linear low density polyethylene, a high density polyethylene, an ethylene propylene copolymer, an elastomer, or an ethylene copolymer, wherein the polymer is optionally substituted with one or more of hydroxy, ester, or anhydride groups, or mixtures of any two or more thereof. Polyethylene and ethylene propylene copolymers are particularly suitable.

Fillers suitable for use in compositions and methods of the invention can be any known to those of skill in the art for use in polymer composites and nanocomposites. Exemplary fillers include but not limited to glass fibers; carbon fibers; particulates of calcium carbonate, metal oxides, or metal hydroxides; or combinations of any two or more thereof. Suitable metal oxides may comprise silicon oxides, titanium oxides, and hydrotalcites. The amount of filler in the composites and nanocomposites may range from about 0.01 to about 99 weight percent (wt %), and more typically from about 0.1 to about 5 wt % or even from about 15 wt % to about 50 wt %.

Other suitable fillers include clays such as phyllosilicates, particularly smectites and mica. Exemplary smectite clays include montmorillonite, hectorite, saponite, sauconite, beidellite, nontronite and synthetic smectites such as Laponite®. As will be well understood by one skilled in the art, the clays discussed herein inherently have basal surfaces and edge surfaces. The clays are arranged in layers of particles which are stacked on top of one another, i.e. the layers are formed at the basal surfaces of the particles. The stacking of the clay platelets provides interlayers, or galleries, between the clay layers. These galleries are normally occupied by cations, typically comprising sodium, potassium, calcium, magnesium ions and combinations thereof, that balance the charge deficiency generated by the isomorphous substitution within the clay layers. Typically, water is also present in the galleries and tends to associate with the cations. The distance between the basal surfaces of adjacent clay layers is referred to as the basal spacing.

In inventive compositions where the fillers are clays, typically surface treated clays that have been modified on both basal surfaces and edges are used. The surface-treated clay can comprise from about 1 to about 99 weight percent (wt %) of the composition. In some embodiments, the surface treated clay comprises about 1 to about 15 wt % or even from about 3 to about 10 wt % of the composition, particularly in nanocomposites.

In embodiments wherein the phyllosilicates are subject to cation exchange, the phyllosilicates are exposed to enough cationic surfactant to approximately satisfy the cationic exchange capacity of the phyllosilicates. For dispersions in aliphatic solvents, waxes, and polyolefins, the amount of cation in the dispersion should be enough to satisfy between about 10 and 100 percent of the cation exchange capacity of the phyllosilicates. This includes embodiments where the amount of cation is sufficient to satisfy between about 75 and 100 percent of the exchange capacity of the phyllosilicate. This has the advantage that it substantially eliminates excess cationic surfactant which is only loosely bound to the phyllosilicate surface and easily separates during processing and composite material formation, degrading the quality of the composite materials. For surfactants having especially high molecular weights and under monolayer adsorption conditions, the exchange rate will necessarily be lower than the cation exchange capacity (CEC) of clays such as the Wyoming bentonites. It should be understood, that the optimum exchange rate will be determined by the interfacial parking area of the surfactant rather than the CEC of the clay.

In preparing organoclays for polyolefin nanocomposites, the cation exchange will be carried out at temperatures at least equal to or above the melting point of the surfactant. For surfactants that melt at temperatures above 100° C., the exchange will be carried out in a reactive extruder that is pressurized to prevent the evaporative loss of water from the clay slurry. Alternatively, when longer residence times are desired during the exchange reaction, the exchange can be carrier out in a pressurized mixer such as a helical mixer manufactured by Design Integrated Technology, Inc.

In another aspect of the invention, there are provided methods for preparing inventive compositions comprising combining a polymer and a filler. The filler comprises a surfactant of the invention as described herein on a surface thereof. Typically the melt/freeze transition of the surfactant and the melt/freeze transition of the polymer are sufficiently matched to form a homogenous dispersion of the filler and the polymer. Thus, the amount of surfactant is sufficient to provide a monolayer coating of all or substantially all of the filler surfaces. Depending on the filler, the surfactant can be present at from about 20 wt. % to about 100 wt % of the untreated filler, or from about 10 wt % to about 50 wt % of the surface-treated filler.

Additives may be employed in polymer compositions of the invention by admixing the additives with the composite or nanocomposite. Such additives include antioxidants, anticorrosion agents, reactive scavengers, such as colloidal metal oxides or hydroxides for improved acid barrier capabilities, oxygen scavengers for improved oxygen barrier capabilities, UV stabilizers, and colorants such as dyes and pigments. In certain embodiments, water-soluble dyes which are not ordinarily dispersible in polyolefins may be used. Generally, in these embodiments the surfactants of the present invention will be capable of binding to the surface of the additive, especially in cases where $H^+$ and $OH^-$ ions are potential determining ions for the additive, i.e., where $H^+$ and $OH^-$ ions are capable of altering the surface charge of the additive.

Compositions prepared according to the present invention display unexpectedly high gas barrier capabilities in comparison to previous filler/polymer composites and nanocomposites. The composites and nanocomposites disclosed herein can routinely reduce the oxygen permeability of wax coatings by a factor of ten to one hundred or more. At sufficient filler concentrations, the permeability may be reduced by one thousand to ten thousand or more. Combinations of composites and nanocomposites containing fillers with polyolefins can also result in significant reductions in gas permeability relative to the pure polymer. Reductions in oxygen permeability of ten to one-hundred fold or more relative to the pure polymer can be achieved with the present invention.

While not wishing to be limited by any theory, the superior performance of polymer composites and nanocomposites prepared with fillers coated with surfactants of the invention is believed due to the relatively close matching of the melt/freeze temperatures of the surfactants and the polymers. For example, currently smectite clays are often coated with dimethyl dihydrogenated tallow ammonium chloride, which shows a melt temperature of about 40° C. and a freeze temperature of about 30° C. However, low density polyethylene melts at about 104-115 C and freezes at about 80-90° C. Due to the wide gap in freezing temperatures between the polymer and the organoclay surfactant coating, the organoclay surface becomes, in effect, an immiscible liquid impurity and is excluded from the polymer during crystal phase formation. To better disperse fillers into polymers, it is necessary to use surfactants that display melt/freeze transitions that more closely match those of the polymer (i.e., LDPE, HDPE, PP, Nylon, EVOH, EVA, polystyrene) and which show a strong affinity for the particle surface. It is also important to use amorphous surfactants to increase compatibility with amorphous polymers (i.e., atactic PP, atactic polystyrene, polydimethylsiloxane). This invention addresses these needs by describing the preparation of a range of new surfactants, both crystalline and amorphous. The invention is illustrated by the examples given below.

The following non-limiting examples serve to further illustrate advantages of the disclosed invention.

EXAMPLES

Example 1

Formation of a High-Melting Surfactant Using Polyethylene Monoalchohol, Isocyano and Catalyst This example illustrates the preparation of a high-melting surfactant suitable for dispersing additives such as fibers, mineral fillers, dyes, and pigments in polyethylene and ethylene propylene random copolymer. A high molecular weight telometric surfactant was prepared by melting 150 g of polyethylene monoalcohol (Aldrich, $M_n$ 460, OH number=105 mg KOH/g) in a three-neck, round-bottom glass reactor at 170° C., under nitrogen purge. The reactor was also equipped with a magnetic stirrer. Once the alcohol was melted, a stoichiometric amount of 1,6-diisocyanatohexane and 0.086 g dibutyltin dilaurate (a catalyst) were added to the reactor with stirring. The melt was stirred for several hours, removed from the reactor and cooled to yield a crystalline product. Surprisingly, the melting point of the product was considerably higher than that of the starting alcohol. The starting monoalcohol has a main melting peak at approximately 80° C. that is visible by differential scanning calorimetry (DSC). However, DSC measurements of the dialkyl urethane product (see FIG. 1) indicate that the main melting point has been increased to 110° C., with minor melting points at 125° and 80° C. The material melting at 80° C. is presumably unreacted hydrocarbons (i.e., non-functionalized hydrocarbons present in the polyethylene monoalcohol).

To illustrate the ability of the surfactant to aid in the dispersion of polar species into nonpolar systems, the surfactant was dissolved in hot toluene (100° C.) together with fumed silica (average particle size 0.011 microns) at a dispersed solids concentration of 5 weight percent. The amount of surfactant added was sufficient to produce a silica to surfactant weight ratio of 1:0.5. At this surfactant loading, the silica did not completely disperse in the toluene and the dispersed particles were clearly flocculated. Increasing the surfactant loading to a weight ratio of 1:1 by adding additional surfactant to produce a complete monolayer on the surface of the silica particles caused the fumed silica to transition from a flocculated state to a dispersed state in the hot toluene. Evidence that the silica had been dispersed at the nanoscale is provided by the complete lack of any low-angle scattering of visible light from the dispersion. As the silica dispersion was cooled, the surfactant-coated silica went through a freeze transition and the dispersion became solid and opaque. When reheated to 100° C., the dispersion again became colorless and transparent.

To demonstrate that the coated particles were capable of dispersion after removal of the solvent, the toluene was evaporated to produce a fine, white powder. The coated silica was dispersed in low density polyethylene by melt compounding to produce a transparent nanocomposite melt. The particles remained dispersed after cooling the nanocomposite to room temperature.

To further illustrate the ability of the surfactant to aid in the dispersion of polar species into nonpolar systems, the surfactant was melt mixed with a hydrotalcite (Hysafe 510, H. M. Huber) at a weight ratio of 1:1. The coated particles were then compounded in LDPE by melt mixing. Compression molded films were very clear, indicating that the surfactant is adsorbed onto the particle surface and aids dispersion into hydrophobic polymers.

Example 2

Preparation of a Quaternary Amine

A common approach to making clay/polymer nanocomposites in the past has been to treat a smectite clay to make the surface compatible with thermoplastic and thermoset polymers by exchanging the basal surface of the clay with a high-molecular-weight quaternary amine. A commonly used amine is dimethyl dihydrogenated tallow ammonium chloride. The presence of the dimethyl group allows the molecule to adopt an upright position at high surface loadings which in turn allows the two long alkyl chains to shield the polar ammonium cation from the external surface of the surfactant monolayer coating. The presence of two tallow chains in the molecule introduces enough disorder in the monolayer to produce an alkyl chain melting point of approximately 40-50° C. This allows the surface coating to become mobile and facilitates the solvation of the alkyl chains by organic solvents at relatively low temperatures. Aliphatic solvents with chain lengths close to the chain length of the ammonium salt (i.e., $C_{18}$ in the case of tallow) will provide maximum solvation of the surfactant hydrocarbon chains. Replacing the dimethyl functionality with longer-chain radicals inhibits the close packing of the surfactant molecules because the radicals displace the ammonium cation too far from the clay surface to permit sufficient charge stabilization when the molecule is vertically oriented relative to the basal surface of the clay. Thus, the preferred orientation of this class of molecules is horizontal and parallel to the clay surface. This leaves the charged ammonium cation radical exposed on the surface of the clay. The presence of the charged, polar sites (i.e., quaternary ammonium ion) along the clay surface would reduce the degree of solvation by nonpolar species to a level that is below the amount needed for dispersion and exfoliation in hydrophobic solvents and polymers.

For solvation of the surfactant hydrocarbon layer to occur, the hydrocarbon layer must be in the non-crystalline or melt state. This means that dispersion of organoclays, prepared with dimethyl dihydrogenated tallow salts, into solvents and polymers should be attempted at temperatures above the melting point of the surfactant layer. To promote miscibility of the organoclay with a solvent, wax, or polymer in the liquid (i.e., polymer melt) and solid states, it is important to match the melt/freeze transitions of the organoclay surface with that of the organic matrix. However, the melt/freeze temperatures of the dihydrogenated tallow amines do not match those of common polymers such as the polyolefins, nylons, polyesters, polycarbonates, and the like.

Ammonium salts containing a single, long-chain hydrocarbon radical display high melting points that more closely match those of the thermoplastic resins. The effect of chain length(s) on melting point of the surfactants is illustrated in Table 1. The general trend in melting temperature is: trimethyl alkyl ammonium>triethyl alkyl ammonium>dimethyl dialkyl ammonium>tertiary amine. For ammonium salts having melting points above the Hoffman degradation temperature (~150° C.) the salts generally decompose at their respective melting points. The majority of the long chain surfactants in Table 1 are stable to very high temperatures but are not suitable for nanocomposite applications because they decompose at their respective melting points.

TABLE 1

Melting Points of Amines and Ammonium Salts

| Amine | Melting Point, ° C. |
| --- | --- |
| Hexadecyl trimethyl ammonium bromide | >230 (dec) |
| Octadecyl trimethyl ammonium bromide | 250 (dec) |
| Hexadecyl dimethyl ethyl ammonium chloride | 190 (dec) |
| Triethyl methyl ammonium bromide | 307 (dec) |
| (2-hydroxyethyl)trimethyl ammonium chloride | 302 (dec) |
| Triethyl hexyl ammonium bromide | 114-117 |
| Dodecylamine | 30-32 |
| Trimethyl phenyl ammonium chloride | 237 (dec) |
| Trimethyl phenyl ammonium bromide | 215 (dec) |
| Trimethyl phenyl ammonium iodide | 227 (dec) |

(dec) indicates a decomposition temperature

Figure 2:
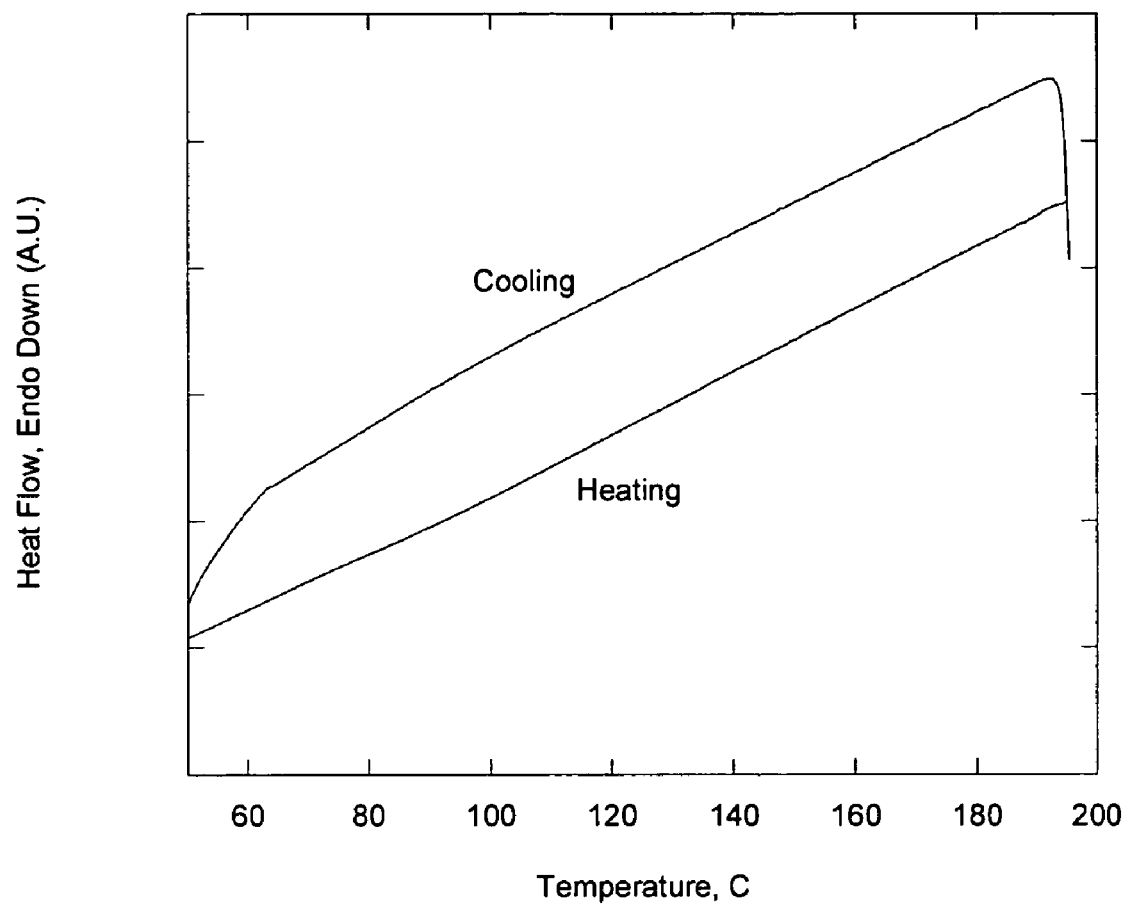
FIG. 2. DSC trace of an organoclay exchanged with cetyl trimethyl ammonium bromide. The data indicate a complete lack of melt/freeze transitions below the degradation temperature of the quaternary amine which is >200° C. Because the organoclay is in a crystal state, it does not show characteristic degradation associated with the Hoffman degradation occurring at 150° C.

To a certain degree, the nature of the counter ion affects the melting point of the ammonium salt (see Table 1). When considering an organoclay prepared by ion exchange with the ammonium salt, the negatively charged clay surface takes on the role of the counter anion, thereby forming a complex salt with the exchanged organic cation. While the scientific literature is silent on this subject, it appears that the melting points of the organoclay are similar to those of the halide salts. For example, DSC measurements (see FIG. 2) of an organoclay prepared from cetyl trimethyl ammonium bromide displays a melt/decomposition temperature >230° C.—similar to that of the starting bromide salt. Thus, ammonium salts/organoclays of this nature, used alone, would not be appropriate for nanocomposite applications due to their thermal instability at the melting point of the organoclay. Processing at temperatures below the melting/decomposition temperature of the organoclay would not lead to exfoliation because the surfactant coating is in the crystalline state and therefore not miscible with a polymer melt. Thus, there is a need for thermally stable surfactants having melt/freeze temperatures that match the thermal transitions of the polymer in a way that is close enough to provide miscibility in the melt and solid states. In this example, the preparation of a novel quaternary amine is described that displays melt/freeze transitions that closely match the thermal transitions of LDPE.

In this example, a quaternary amine salt was prepared by coupling choline chloride with a polyethylene monoalcohol by reaction with a diisocyanate. The challenge is to get the crystalline choline chloride to react with an isocyanate. This problem was solved by converting the choline chloride to a liquid state (i.e., a molten salt with a low melting temperature) by converting it to an ionic liquid by reaction with zinc chloride. The following general procedure was used.

A polyethylene monoalcohol was melted in a three-neck round-bottom flask, equipped with a magnetic stirrer, a condenser, and an inert gas purge. The monoalcohol was reacted with a diisocyanate using dibutyltin dilaurate as a catalyst. Examples of other useful catalysts include, but are not limited to, dibutyltin dilaurate, dibutyltin diacetate, dibutyltin oxide, and stannous octoate. The stoichiometry of the reactants can be adjusted to minimize dimerization of the monoalcohol by the diisocyanate. In this example, 30 g of polyethylene monoalcohol (Aldrich, $M_n$=460, OH number=105 mg/g) was dispersed in 300 g toluene at room temperature (the monoalcohol dissolves in toluene at a temperature of approximately 75° C., thus the toluene initially contains the monoalcohol as a dispersed solid). The diisocyanate (9.45 g 1,6-diisocyanatohexane) was added to the reactor and the dispersion was slowly heated to 75° C. over the course of 1 h and then allowed to react for 3 h. Slow heating in the presence of the diisocyanate provided a high isocyanate to alcohol ratio during the reaction to minimize the formation of the alcoholic telomere [$CH_3C_nH_{2n}OCONHC_6H_{12}NHOCOC_nH_{2n}CH_3$]. Separately, choline chloride was reacted with $ZnCl_2$ at a mole ratio of 1:2 by mixing the components at 155° C. to produce a molten salt (7.83 g choline chloride, 15.3 g $ZnCl_2$). Since choline chloride ($HOCH_2CH_2N(CH_3)_3Cl$) is a crystalline material that is not soluble in nonpolar solvents, converting it into an ionic liquid to enable reaction with the isocyanate is a crucial step. When the quaternary amine was added to the reactor, reaction with the isocyanate produced a white reaction product almost immediately. The toluene was removed by vacuum distillation to produce a white powder. The product was then washed with boiling water to remove $ZnCl_2$ and any unreacted choline chloride. Chloride analysis of the product indicated that it contained 0.98 wt % Chlorine. Based on the average molecular weight of the monoalcohol, the average molecular weight of the product is expected to be 759 and have the following structural formula: [$Cl(CH_3)_3NC_2H_4OCONHC_6H_{12}NHOCOC_{31}H_{62}CH_3$]. The theoretical chloride content based on an average molecular weight of 759 is 4.5 weight percent. The estimated conversion of the choline to the high molecular weight quaternary amine is therefore 22%. Other components in the product include, but are not limited to, the alcoholic telomer and unreacted hydrocarbons.

As is well known, the choline chloride ionic liquid can be prepared at various choline chloride:zinc chloride molar ratios, including (1:1), (1:2), and (1:3). However, using the ionic liquid prepared at a (1:1) molar ratio failed to produce any reaction in the toluene system and simply formed a phase separated liquid/liquid system at elevated temperatures. The ionic liquid prepared at higher zinc chloride ratios would introduce excess material that would have to be removed during later processing into a nanocomposite. A unique feature of the (1:2) liquid is the fact that the zinc forms a series of complex anions with highly delocalized charge (i.e., $ZnCl_3^-$, $Zn_2Cl_5^-$, $Zn_3Cl_7^-$). The quaternary amine can be prepared as the chloride salt or alternatively, the product can be left as the complex $ZnCl_3^-$ salt.

Other useful aliphatic diisocyanates include: 1,4-tetramethylene diisocyanate, hexamethylene 1,4-tetramethylene diisocyanate, 1,8-octamethylene diisocyanate, 1,12-dodecane diisocyanate, 2,4-diisocyanatotolyene.

Long chain aliphatic monofunctional compounds capable of reacting with an isocyanate functionality are included in various embodiments of the present invention. These include but are not limited to: —$NH_2$, —SH, —OH. Long chain aliphatic alcohols are especially useful, and include but not limited to: 1-decanol, 1-dodecanol, 1-hexadecanol, 1-octadecanol, and the like including longer-chain alcohol derivatives of polyethylene and polypropylene. The polymeric derivatives may be crystalline or amorphous.

Example 3

Preparation of a Quaternary Amine

This example illustrates the preparation of a high-molecular-weight quaternary amine similar to Example 2, but with an alcohol having a higher molecular weight and with the synthesis carried out in the absence of a solvent. Approximately 0.05 mol of polyethylene monoalcohol (Aldrich, $M_n$=700, this material contains 15-20 weight percent unreacted hydrocarbon) was melted at 150° C. under an inert atmosphere. An equal molar amount of 1,6-diisocyanatohexane was added to the reactor followed by 0.06 weight percent dibutyltin dilaurate. The mixture was allowed to react at 150° C. for approximately 1 h, after which the choline chloride ionic liquid was added in an amount sufficient to provide 0.05 mol of choline chloride. The quaternary amine was slowly reacted over a period of 1 h. During that time, the system remained as a single phase with low viscosity. After completion of the reaction, the product was poured into a stainless steel pan to cool. It was then crushed to produce a powder and washed with boiling water to remove $ZnCl_2$ leaving the quaternary ammonium chloride salt. The final product was a hydrophobic, white powder. Chloride analysis indicated a chloride content of 0.56 weight percent. A calculated theoretical chloride content, based on complete reaction, is 2.6 weight percent. The concentration of quaternary ammonium chloride in the product is thus 21.5 percent. The remainder of the material is believed to be a telometric reaction product: [$CH_3(CH_2)_nO_2CN(H)C_6H_{12}N(H)CO_2(CH_2)_nCH_3$]. During the addition of the ionic liquid to the reactor, there was a small amount of carbon dioxide gas liberated. This is believed to be generated from reaction of the isocyanate with a small amount of water present in the ionic liquid. If needed, the water could be removed from the ionic liquid prior to condensation with the isocyanate. A useful method to remove water from a molten salt is to react it with a metal that forms a stable, inert oxide, thereby converting the water to hydrogen and the metal to a metal oxide. Examples of metals that can be used to remove water from this reaction and produce stable oxides are aluminum, cerium, lanthanum, zirconium.

Example 4

Preparation of a High Melting Temperature Anionic Surfactant

This example demonstrates preparation of an anionic surfactant that displays high melting temperature, thus making it especially compatible with LDPE and HDPE. Fifty grams of the polyethylene monoalcohol used in Example 3 was melted in a three-neck, round bottom flask equipped with a magnetic stirrer and a condenser with a nitrogen purge. The monoalcohol was reacted with an excess of 1,6-diisocyanatohexane (26 g) to preferentially produce the mono-substituted product. The reaction was carried out at 150° C. for 1 h with stirring. Additionally, 0.05 weight percent dibutyltin dilaurate was included as catalyst. Finally, 29 g of ethyl lactate was added to the reactor and the stirring continued for an additional hour. The product was removed from the reactor and quenched to room temperature to produce a crystalline solid. The ester was then hydrolyzed to produce the high-molecular-weight derivative of sodium lactate. The ethyl lactate derivative was placed in a stainless steel Parr reactor along with a stoichiometric amount of sodium hydroxide, together with 1200 g of distilled water. The sealed reactor was heated to 140° C. with stirring for 3.5 h and then slowly cooled to room temperature overnight. Before heating, the reactor was evacuated to remove oxygen. The pH of the water, after reaction, was about 8-9, indicating that over 99% of the sodium hydroxide had reacted with the ester to produce the sodium salt. The product was filtered and washed with boiling, deionized water. The melting point of the product was measured and found to be approximately 110° C.

Example 5

Preparation of a High Melting Temperature Anionic Surfactant

In this example, a functionalized ethyl lactate was prepared substantially as in Example 4. However, instead of using sodium hydroxide, the ester was hydrolyzed by lithium hydroxide to produce the high-molecular-weight derivative of lithium lactate. The ethyl lactate derivative was placed in a stainless steel Parr reactor along with a stoichiometric amount of lithium hydroxide, together with 1200 g of distilled water. The reactor was heated to about 140° C. with stirring for 3 h and then allowed to cool to room temperature overnight. Before heating, the reactor was evacuated to remove oxygen. The pH of the water, after reaction, was about 8, indicating that over 99% of the lithium hydroxide had reacted with the ester to produce the lithium salt. The product was filtered and washed with boiling, deionized water. The melting point of the product was measured and found to contain two crystal melt transitions at 110 and 167° C., respectively.

Example 6

Preparation of a High Melting Temperature Anionic Surfactant

A derivative of ethyl lactate was prepared by combining 75 g octadecyl isocyanate, 29.9 g ethyl lactate, and 0.03 g dibutyltin dilaurate in a three-neck, round-bottom flask equipped with a magnetic stirrer and a condenser. The reaction was carried out under nitrogen purge at 150° C. After 2 h, the product was removed from the flask and quenched by pouring into a stainless steel pan. The melting point of the ethyl lactate product was >100° C. while all of the starting materials were liquids at room temperature. To hydrolyze the ester, 95 g of the ester was added to a Parr reactor along with 1200 g distilled water and 5.5 g lithium hydroxide. Before heating, the reactor was evacuated to remove oxygen. The hydrolysis of the ester was carried out at 250° C. with stirring for 3 h and then left to slowly cool to room temperature overnight. The pH of the water, after reaction, was 7, indicating complete conversion of the ester to the lithium salt. The white precipitate was filtered and washed with boiling distilled water. The melting point of the lithium salt was measured and found to be 85° C.

Example 7

Demonstration of Dispersion of the Surfactants

This example shows the ability of the surfactants of Examples 4-6 to disperse in polyethylene and to nucleate crystal growth. High density polyethylene was examined in polarized light to reveal crystal spherulites having diameters of about 100 microns. To illustrate the ability of the sodium salt of Example 4 to nucleate crystal growth in HDPE, the salt was compounded into HDPE at a level of 0.5 weight percent. A compression molded film was prepared at 190° C. and examined under polarized light to reveal that the spherulite size was reduced from about 100 microns in the neat polymer to about 50 microns.

Example 8

Effect of an Increase in Melting Point

This example illustrates the effect of increasing the melting point of the lactate salt on the nucleation of HDPE. The lithium salt of example 6 was melt compounded into HDPE at a loading level of 0.5 weight percent. A compression molded film was prepared at 190° C. and examined under polarized light to reveal that the spherulite size has now been reduced from about 100 microns in the neat polymer to about 30 microns.

Example 9

High Melting, Thermally Stable Quaternary Amine

Figure 3:
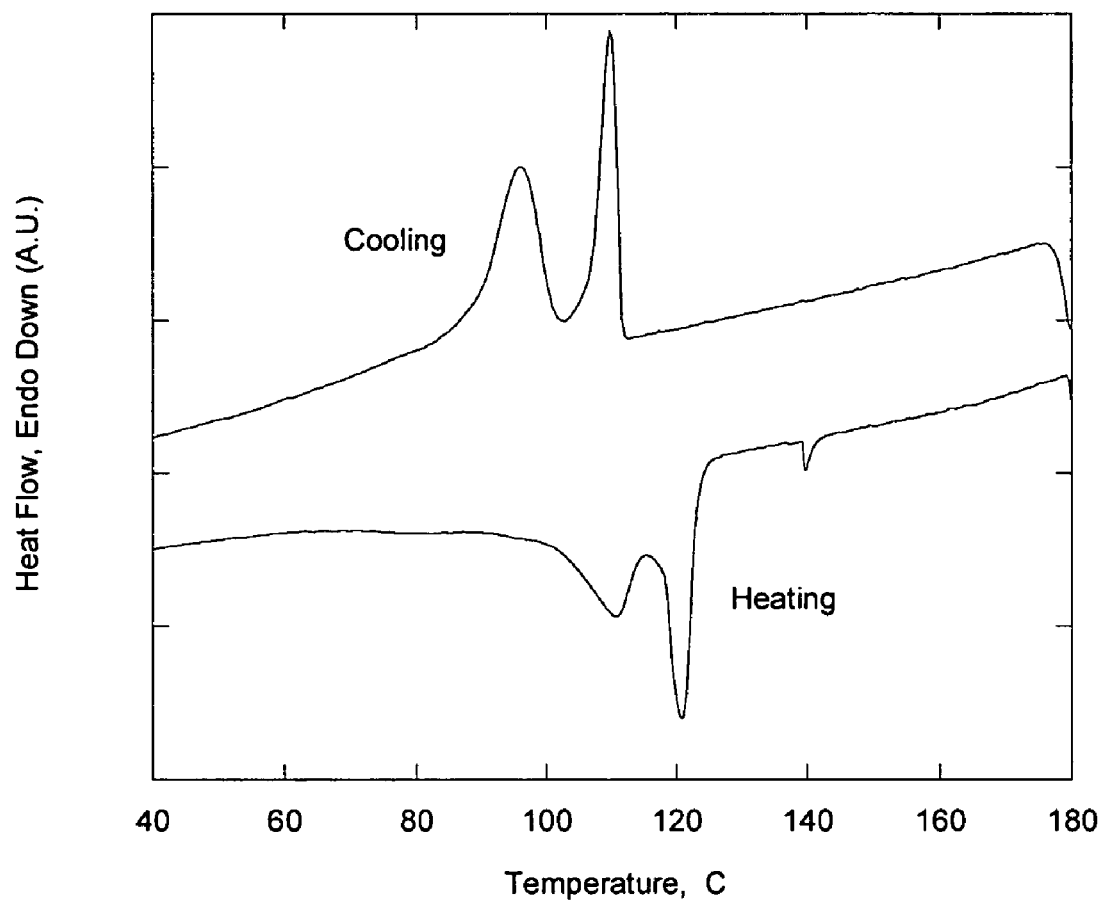
FIG. 3. DSC trace of the quaternary amine of Example 9

In this example, a high molecular weight quaternary amine was prepared by coupling polyethylene monoalcohol to an amine via reaction with a diisocyanate. A polyethylene monoalcohol was melted in a three-neck round-bottom flask, equipped with a stainless steel stirrer, a condenser, and an inert gas purge. The monoalcohol was reacted with a diisocyanate in the presence of dimethylethanol amine and using dibutyltin dilaurate as a catalyst. In this preparation, 250 g of polyethylene monoalcohol (Aldrich, $M_n$=700, OH number=65 mg/g) was melted at 100° C. in the reaction vessel. The remainder of the reactants was added, 29.9 g N,N-dimethylethanol amine (Aldrich), 15 mL of dibutyltin dilaurate, followed by addition of 49.7 g 1,6-diisocyanatohexane. The mixture was heated to 135° C. and mixed for 0.5 h. To convert the amine to a quaternary amine, the product was reacted with 36.5 g dimethyl sulfate for 1 h. The product was then quenched in a stainless steel. The melting point of the product was measured by DSC. The data in FIG. 3 show that the quaternary amine has two primary melt transitions at approximately 105 and 120° C., respectively. The material was heated to 180° C. during the scan with no evidence of degradation. The cooling curve shows two freeze transitions at approximately 110 and 95° C. This quaternary amine is unique in the sense that, unlike the surfactants listed in Table 1, it shows reproducible melt/freeze transitions even after being heated to temperatures in excess of 150° C.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While preferred embodiments have been illustrated and described, it should be understood that changes and modifications can be made therein in accordance with ordinary skill in the art without departing from the invention in its broader aspects as defined in the following claims.

What is claimed is:

1. A compound having Formula I:

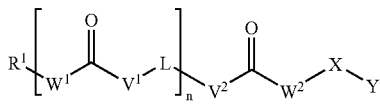

wherein
$W^1$ and $W^2$ are independently O, S, or NH;
$V^1$ and $V^2$ are independently O or NH;
L and X are independently a $C_{2-20}$ alkylene, cycloalkylene, or arylene group, optionally substituted with one or more F, Cl, Br, or $CF_3$;
Y is $-COOR^2$, $-N(R^3)_3{}^+Z$, $-OSO_3R^4{}_2$, $-SO_3R^4$, $-OPO_3R^4{}_2$, $-PO_3R^4$, or $-PO_2R^4$; or X and Y together form $R^1$;
Z is a negatively charged counter ion;
$R^1$ at each occurrence is independently a $C_{10-100}$ alkyl or alkenyl, group, each optionally substituted with one or more F, Cl, or Br;
$R^2$ is H, a positively charged counter ion, or an alkyl, alkenyl, aryl, aralkyl, heterocyclyl, or heterocyclalkyl group;
$R^3$ at each occurrence is independently $C_{1-4}$ alkyl;
$R^4$ at each occurrence is independently H or a positively charged counter ion; and
n is 0, 1, 2, or 3.

2. The compound of claim 1 wherein $W^1$ and $W^2$ are both O or both NH.

3. The compound of claim 1 wherein one of $W^1$ and $V^1$ is O and one is NH, and one of $W^2$ and $V^2$ is O and one is NH.

4. The compound of claim 1 wherein L and X are each a $C_{2-20}$ alkylene optionally substituted with one or more F, Cl, or Br.

5. The compound of claim 1 wherein L and X are independently ethylene, propylene, butylene, hexylene, octylene, decylene, dodecylene, phenylene or tolylene.

6. The compound of claim 1 wherein Y is $-COOH$ or $-N(CH_3)_3{}^+Z$.

7. The compound of claim 1 wherein Z is $F^-$, $Cl^-$, $Br^-$, $I^-$, $SO_4{}^{2-}$, $HSO_4{}^-$, or $CH_3OSO_3{}^-$.

8. The compound of claim 1 wherein $R^2$ is H, $Li^+$, $Na^+$, $K^+$, methyl, ethyl, or benzyl.

9. The compound of claim 1 wherein $R^1$ is a $C_{20-60}$ polyethylene group, optionally substituted with one or more F, Cl, or Br.

10. The compound of claim 1 having the Formula IA:

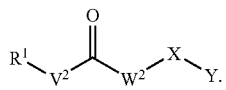

11. The compound of claim 1 having the Formula IB:

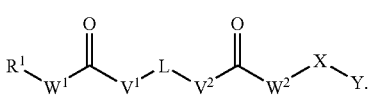

12. A method of making a compound of claim 1, the method comprising
reacting an isocyanate having the structure $R^1$-L-NCO with H—$W^2$—X—Y to provide a compound of Formula IA1, or reacting an isocyanate having the structure OCN—$W^2$—X—Y with $R^1$-L-$V^2$—H to provide a compound of Formula IA2

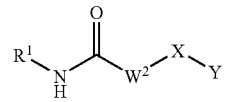

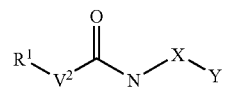

wherein
$W^2$ is O, S, or NH;
$V^2$ is O or NH;
X is a $C_{2-20}$ alkylene, cycloalkylene, or arylene group, optionally substituted with one or more F, Cl, Br, or $CF_3$;
Y is $-COOR^2$, $-N(R^3)_3{}^+Z$, $-OSO_3R^4{}_2$, $-SO_3R^4$, $-OPO_3R^4{}_2$, $-PO_3R^4$, or $-PO_2R^4$; or X and Y together form $R^1$;
Z is a negatively charged counter ion;
$R^1$ at each occurrence is independently a $C_{10-100}$ alkyl or alkenyl, group, each optionally substituted with one or more F, Cl, or Br;
$R^2$ is H, a positively charged counter ion, or an alkyl, alkenyl, aryl, aralkyl, heterocyclyl, or heterocyclalkyl group;
$R^3$ at each occurrence is independently $C_{1-4}$ alkyl; and
$R^4$ at each occurrence is independently H or a positively charged counter ion.

13. A method of making a compound of claim 1, the method comprising
reacting a diisocyanate having the structure OCN-L-NCO sequentially or simultaneously with compounds having the structure H—$W^2$—$R^1$ and H—$W^2$—X—Y
to provide a compound of Formula IB

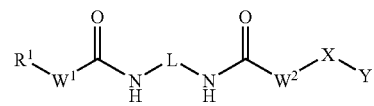

wherein
$W^1$ and $W^2$ are independently O, S, or NH;
L and X are independently a $C_{2-20}$ alkylene, cycloalkylene, or arylene group, optionally substituted with one or more F, Cl, Br, or $CF_3$;
Y is $-COOR^2$, $-N(R^3)_3{}^+Z$, $-OSO_3R^4{}_2$, $-SO_3R^4$, $-OPO_3R^4{}_2$, $-PO_3R^4$, or $-PO_2R^4$; or X and Y together form $R^1$;
Z is a negatively charged counter ion;
$R^1$ at each occurrence is independently a $C_{10-100}$ alkyl or alkenyl, group, each optionally substituted with one or more F, Cl, or Br;

$R^2$ is H, a positively charged counter ion, or an alkyl, alkenyl, aryl, aralkyl, heterocyclyl, or heterocyclalkyl group;

$R^3$ at each occurrence is independently $C_{1-4}$ alkyl; and $R^4$ at each occurrence is independently H or a positively charged counter ion.

14. The method of claim 13 wherein Y is $-N(R^3)_3{}^+Z$ and H—$W^2$—X—Y is an ionic liquid.

15. The method of making a compound of claim 1 comprising reacting a compound having the structure H—$V^1$-L-$V^2$—H sequentially or simultaneously with compounds having the structure OCN—$W^2$—$R^1$ and OCN—$W^2$—X—Y to provide a compound of Formula IB2:

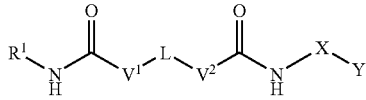

IB2 wherein $V^1$ and $V^2$ are independently O or NH;

L and X are independently a $C_{2-20}$ alkylene, cycloalkylene, or arylene group, optionally substituted with one or more F, Cl, Br, or $CF_3$.

Y is —$COOR^2$, —$N(R^3)_3{}^+Z$, —$OSO_3R^4{}_2$, —$SO_3R^4$, —$OPO_3R^4{}_2$, —$PO_3R^4$, or —$PO_2R^4$; or X and Y together form $R^1$;

Z is a negatively charged counter ion;

$R^1$ at each occurrence is independently a $C_{10-100}$ alkyl or alkenyl, group, each optionally substituted with one or more F, Cl, or Br;

$R^2$ is H, a positively charged counter ion, or an alkyl, alkenyl, aryl, aralkyl, heterocyclyl, or heterocyclalkyl group;

$R^3$ at each occurrence is independently $C_{1-4}$ alkyl; and $R^4$ at each occurrence is independently H or a positively charged counter ion.

* * * * *